United States Patent
Lee et al.

(10) Patent No.: US 7,626,658 B2
(45) Date of Patent: Dec. 1, 2009

(54) LIQUID CRYSTAL DISPLAY DEVICE WITH COLOR FILTER COVERING EXTENDED BLACK MATRIX AT A SEAL PATTERN REGION AT PERIPHERY OF THE DISPLAY ACTIVE REGION

(75) Inventors: Jae Kyun Lee, Goonpo-si (KR); Seung Ryull Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 705 days.

(21) Appl. No.: 11/139,511

(22) Filed: May 31, 2005

(65) Prior Publication Data
US 2005/0264721 A1 Dec. 1, 2005

(30) Foreign Application Priority Data
May 31, 2004 (KR) .................. 10-2004-0038845

(51) Int. Cl.
*G02F 1/1335* (2006.01)
(52) U.S. Cl. .................. 349/106; 349/108; 349/110
(58) Field of Classification Search .......... 349/106–111
See application file for complete search history.

(56) References Cited

U.S. PATENT DOCUMENTS

| | | | |
|---|---|---|---|
| 6,181,406 B1 * | 1/2001 | Morimoto et al. | 349/155 |
| 6,927,815 B2 * | 8/2005 | Lai | 349/108 |
| 6,975,379 B2 * | 12/2005 | Kim et al. | 349/155 |
| 7,336,333 B2 * | 2/2008 | Song | 349/153 |
| 2003/0043319 A1 * | 3/2003 | Mima | 349/110 |
| 2004/0257501 A1 * | 12/2004 | Kim et al. | 349/110 |

\* cited by examiner

*Primary Examiner*—John Heyman
(74) *Attorney, Agent, or Firm*—McKenna Long & Aldridge LLP (57) ABSTRACT

A liquid crystal display device includes: upper and lower substrates facing each other, an active region and a non-active region being defined therein; a liquid crystal layer interposed between the upper substrate and the lower substrate; a black matrix formed in the non-active region of the upper or lower substrate; and a color filter overlapping the black matrix formed in the non-active region. The color filter is formed of one of red, green and blue color filters having a low transmittance with respect to a specific wavelength of light so as to prevent transmission of the light of the specific wavelength.

14 Claims, 5 Drawing Sheets

LIQUID CRYSTAL DISPLAY DEVICE WITH COLOR FILTER COVERING EXTENDED BLACK MATRIX AT A SEAL PATTERN REGION AT PERIPHERY OF THE DISPLAY ACTIVE REGION

This application claims the benefit of Korean Patent Application No. 2004-38845, filed on May 31, 2004, which is hereby incorporated by reference for all purposes as if fully set forth herein.

BACKGROUND OF THE INVENTION

1. Field of the Invention

The present invention relates to a liquid crystal display device. More particularly, the present invention relates to a liquid crystal display device having a light leakage preventing structure in a periphery of an active region.

2. Description of the Related Art

A liquid crystal display device (LCD) has low power consumption and good portability. Also, the LCD is considered as a next generation display device having high added value.

In the LCD, liquid crystals are injected between two substrates in which transparent electrodes are formed and images are displayed using anisotropy of the liquid crystals according to a difference of refractive indexes.

Recently, an active matrix LCD (hereinafter, simply referred to as LCD) has better resolution and moving image reproducibility and thus is most spotlighted. The active matrix LCD includes a plurality of switching thin film transistors that can control the on/off of voltage according to pixels.

Figure 1:
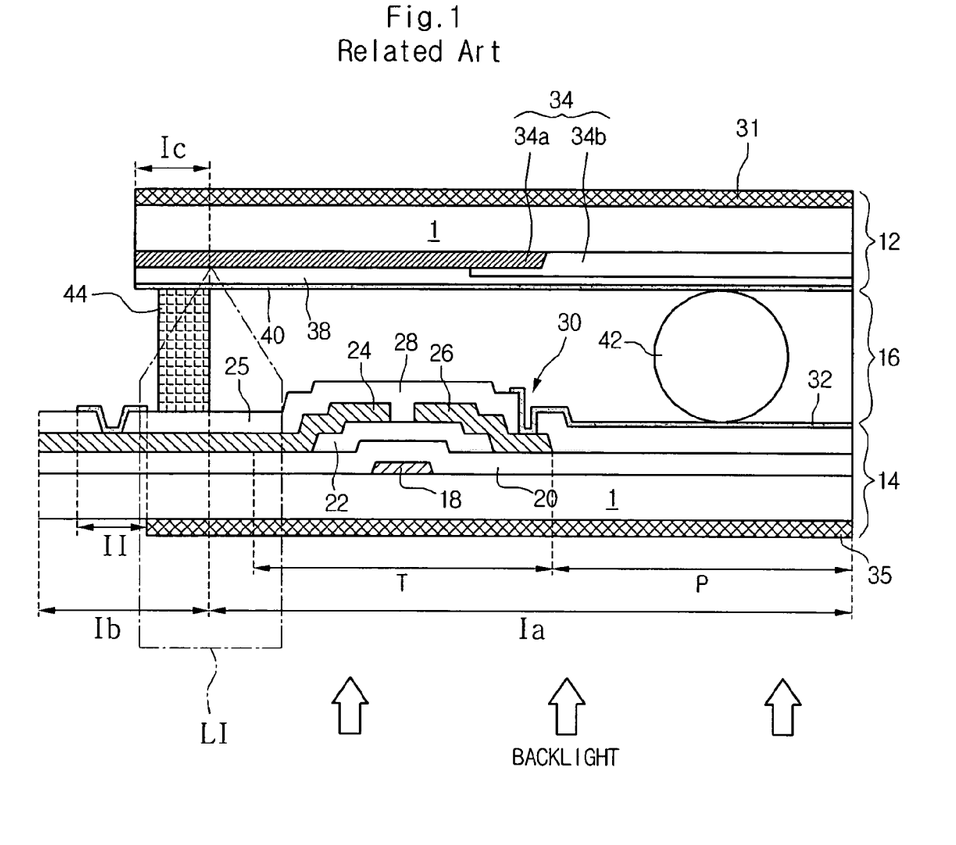
FIG. 1 is a sectional view of a related art LCD.

FIG. 1 is a sectional view of a related art LCD.

In FIG. 1, the related art LCD includes an upper substrate (a color filter substrate) 12, a lower substrate (an array substrate) 14, and a liquid crystal layer 16. The upper substrate 12 is arranged opposite the lower substrate 14, and the liquid crystal layer 16 is interposed between the upper substrate 12 and the lower substrate 14.

An active region Ia containing a pixel region P is defined in the lower substrate 14, and a first non-active region Ib is defined in an outer periphery of the active region Ia. A second non-active region Ic is defined in the upper substrate 12. The second non-active region Ic is located at a position that is more inside the active region Ia than the first non-active region Ib corresponding to the lower substrate 14.

A thin film transistor T is formed on the active region Ia of the lower substrate 14. The thin film transistor T includes a gate electrode 18, a semiconductor layer 22, and source and drain electrodes 24 and 26. Also, a pixel electrode 32 connected to the thin film transistor T is formed on the pixel region P.

A color filter layer 34, a planarization layer 38, and a common electrode 40 are sequentially formed on the upper substrate 12. At this time, the color filter layer 34 includes a black matrix 34a and a color filter 34b. The black matrix 34a is formed over the thin film transistor T and the second non-active region Ic, and the color filter 34b partially overlaps the black matrix 34a and includes red (R), green (B) and blue (B) colors that are repetitively formed on the pixel region P.

Although not shown in FIG. 1, upper and lower alignment layers are formed in an inner surface of the upper and lower substrates 12 and 14 contacting the liquid crystal layer 16.

A spacer 42 is formed inside the liquid crystal layer 16 so as to constantly maintain a cell gap between the upper and lower substrates 12 and 14. In order to maintain the cell gap and prevent leakage of the liquid crystal layer, a seal pattern 44 is formed in an outer periphery of the active region Ia between the upper and lower substrates 12 and 14.

In order to connect an external circuit and the LCD, a data pad part II is formed at an end portion of data line 25, which is integrally formed with the source electrode 24 of the thin film transistor T, in the first non-active region Ib of the lower substrate 14.

Upper and lower polarizers 31 and 35 are respectively attached on outer surfaces of the upper and lower substrates 12 and 14, and a backlight is disposed at a lower portion of the lower polarizer 35 so as to supply an additional light source.

In such an LCD, the black matrix 34a is formed in the non-active region, except the thin film transistor region and the color filter 34b. Therefore, it is possible to effectively shield the light source LI corresponding to the non-active region in the periphery portion of the seal pattern 44 and to prevent a lightening phenomenon at a periphery of a screen.

The black matrix 34a is formed of a metal thin film such as Cr having an Optical Density (OD) of 3.5 or more, or carbon-based organic material, or a photo-acryl resin. A dual-layer structure of Cr/CrOx may also be used for the purpose of low reflection of the screen.

However, when the black matrix 34a is formed of a metal such as Cr, low resistance results in a leakage current. This causes distortion of an electric field and affects an image. Thus, it is preferable to use a resin black matrix that can prevent the leakage current because of its high resistance. A specific resistance of the resin black matrix 34a is about $10^7$ Ω.

However, the resin black matrix has different transmittance characteristics in wavelengths of incident light according to the manufacturing methods of the resin black matrix. The transmittance characteristics are determined by the OD (Optical Density) characteristic that is an ability to shield light.

In recent years, the LCD is becoming larger and the backlight is also becoming larger and brighter. However, when such a high brightness model, that is, high-brightness beam of 5000 nit or more, is supplied to the LCD panel, the resin black matrix 34a has an OD value that is changed by a transmittance characteristic, as described above. Thus, the beam cannot be effectively shielded.

In addition to the related art TN LCD shown in FIG. 1, a related art In-Plane Switching (IPS) LCD and a Thin film transistor On Color filter (TOC) LCD or a Color filter On Thin film transistor (COT) LCD where the color filter layer and the array element are formed together on the lower substrate cannot overcome the above problems.

SUMMARY OF THE INVENTION

Accordingly, the present invention is directed to an LCD that substantially obviates one or more problems due to limitations and disadvantages of the related art.

An advantage of the present invention is to provide an LCD that is capable of preventing light leakage with respect to a specific wavelength in a black matrix formed of a non-active region. In the LCD, a color filter layer is formed in contact with the black matrix, wherein the color filter layer absorbs a light of a wavelength having a relatively low OD value using an OD characteristic of the black matrix formed in the non-active region.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these advantages and in accordance with the purpose of the invention, as embodied and broadly described herein, there is provided a liquid crystal display device, including: upper and lower substrates facing each other, an active region and a non-active region being defined therein; a liquid crystal layer interposed between the upper substrate and the lower substrate; a black matrix formed in the non-active region of the upper or lower substrate; and a color filter overlapping the black matrix formed in the non-active region. The color filter is formed of one of red, green and blue color filters having a low transmittance with respect to a specific wavelength of light so as to prevent transmission of the light of the specific wavelength through the black matrix.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 2A:
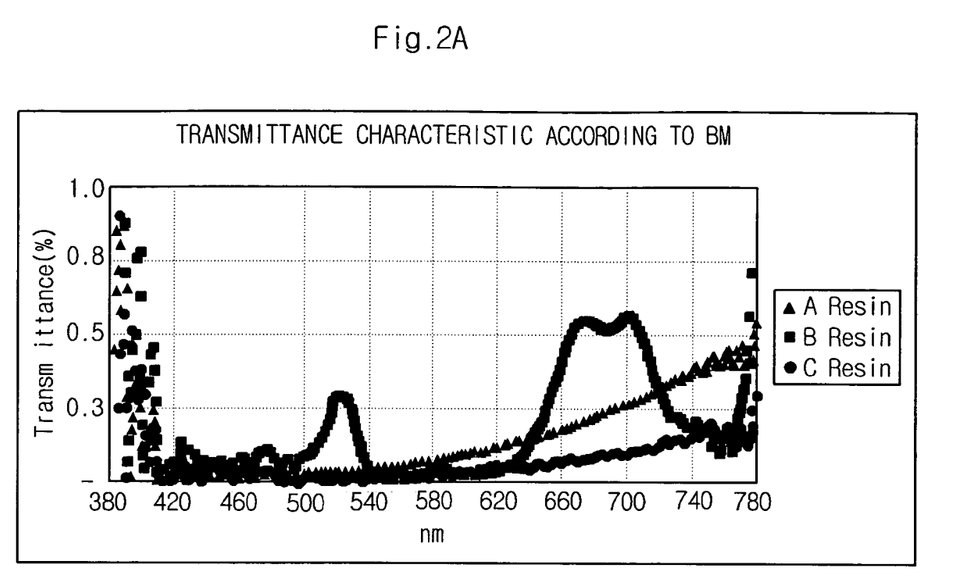
FIG. 2A is a graph of a transmittance characteristic in visible ray region with respect to a resin black matrix.
Figure 2B:
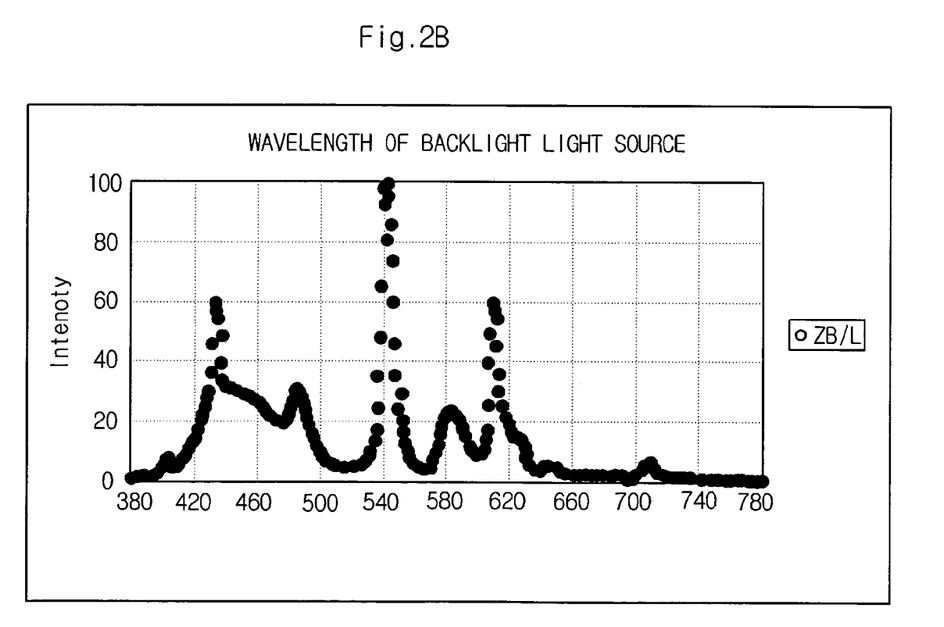
FIG. 2B is a graph of an intensity according to wavelengths of light from a backlight.
Figure 2C:
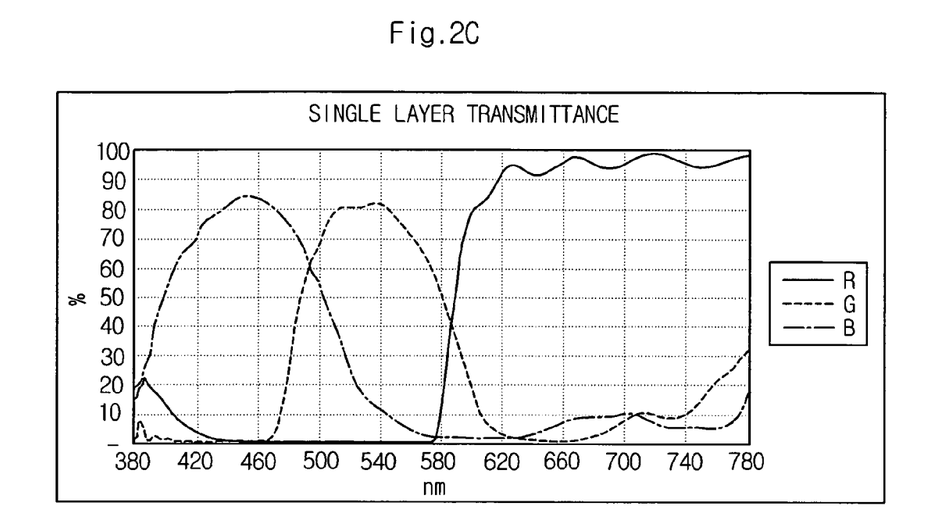
FIG. 2C is a graph of a transmittance characteristic of red, green and blue color filters.

FIGS. 2A, 2B and 2C are graphs illustrating a transmittance characteristic in a visible ray region with respect to a resin black matrix, an intensity of light according to wavelengths of light from a backlight, and a transmittance characteristic of red, green and blue color filters, respectively.

As shown in FIG. 2A, the transmittance characteristics are different from one another according to the manufacturing methods and the difference of materials (A, B, C) of the respective resin black matrices.

That is, the black matrices formed of the materials A, B and C have wavelength regions that have independently high transmittance. Thus, the respective black matrices have different transmittance characteristics in the different wavelengths, and thus an amount of the transmittance is different according to the intensity in the wavelengths of light from the backlight.

For example, in the case of the resin black matrix made of material A, the transmittance increases in the wavelength of 550 nm or more.

Accordingly, when the beam from the backlight has a wavelength of 550 nm or more, light leakage occurs severely in the non-active region of the LCD having the resin black matrix of material A.

On the contrary, the transmittance characteristics of the R, G and B color filters are shown in FIG. 2C. With respect to a wavelength of 550 nm, the transmittance characteristics of the B color filter are lower than those of the R and G color filters.

In this embodiment, considering the characteristic that the Optical Density (OD) value changes in the wavelengths of the resin black matrix, one of the R, G and B color filters used in the color filter layer is formed on the upper or lower portion of the resin black matrix formed on the non-active region. In this manner, it is possible to prevent the light having the OD vulnerable wavelength of the resin black matrix from passing through the resin black matrix.

For example, by additionally forming the B color filter in the non-active region of the LCD having the resin black matrix made of material A, the characteristic of the resin black matrix that is susceptible to the wavelength of 550 nm or more can be improved. Consequently, the light leakage in the periphery of the LCD can be prevented.

Figure 3:
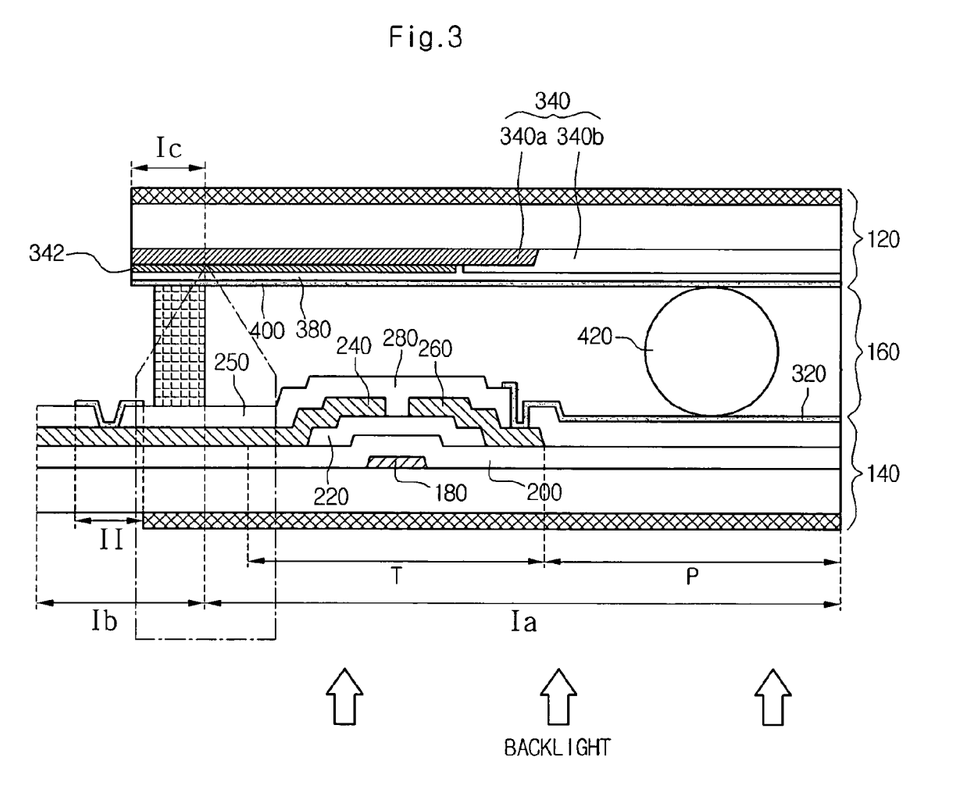
FIG. 3 is a sectional view of an LCD according to an embodiment of the present invention.

FIG. 3 is a sectional view of an LCD according to an embodiment of the present invention.

A Twisted Nematic (TN) LCD is shown in FIG. 3. A predetermined color filter 342 is additionally formed so as to prevent light leakage due to transmittance with respect to a specific wavelength in the resin black matrix of the non-active region.

In FIG. 3, the LCD includes an upper substrate (a color filter substrate) 120, a lower substrate (an array substrate) 140, and a liquid crystal layer 160. The upper substrate 120 is arranged facing the lower substrate 140, and the liquid crystal layer 160 is interposed between the upper substrate 120 and the lower substrate 140.

An active region Ia containing a pixel region P is defined in the lower substrate 140, and a first non-active region Ib is defined in an outer periphery of the active region Ia. A second non-active region Ic is defined in the upper substrate 120. The second non-active region Ic is located at a position that is, as a whole, closer to the active region Ia than the first non-active region Ib corresponding to the lower substrate 140.

A thin film transistor T is formed on the active region Ia of the lower substrate 140. The thin film transistor T includes a gate electrode 180, a semiconductor layer 220, and source and drain electrodes 240 and 260. Also, a pixel electrode 320 connected to the thin film transistor T is formed on the pixel region P.

A color filter layer 340, a planarization layer 380, and a common electrode 400 are sequentially formed on the upper substrate 120.

At this time, the color filter layer 340 includes a black matrix 340a and a color filter 340b. The black matrix 340a is formed over the thin film transistor T and the second non-active region Ic, and the color filter 340b partially overlaps the black matrix 340a and includes red (R), green (B) and blue (B) colors that are repetitively formed on the pixel region P.

In this embodiment, a predetermined color filter 342 is further formed in contact with the black matrix 340a formed in a periphery of the active region Ia.

As described above, in the resin black matrix, the Optical Density (OD) value varies with the wavelengths of the incident light. Thus, considering this characteristic, one of the R, G and B color filters used in the color filter layer 340 is formed on the upper or lower portion of the resin black matrix 340a formed in the non-active region. In this manner, it is possible to prevent the light having the OD vulnerable wavelength of the resin black matrix from passing through the resin black matrix.

That is, the resin black matrix 340a has different transmittance characteristics in the different wavelengths of the incident light according to the manufacturing methods of the resin black matrix 340a. The OD characteristic that can shield light is determined by the transmittance characteristics. When such a high brightness model, that is, high-brightness beam of 5000 nit or more, is supplied to the LCD panel, the resin black matrix 340a has the OD value that is changed by a transmittance characteristic, as described above. Thus, the beam cannot be effectively shielded.

According to the present invention, however, the transmittance characteristics of the specific wavelength in the resin black matrix 340a can be improved by additionally forming one color filter 342 of the R, G and B color filters in contact with the resin black matrix 340a formed in the non-active region.

In FIGS. 2A and 2B, the characteristics of the resin black matrix that is made of material A and is susceptible to a wavelength of 550 nm or more can be improved by further forming the B color filter in the non-active region where the resin black matrix made of material A is formed. Consequently, the light leakage in the periphery of the LCD can be prevented.

Although the color filter is formed below and in contact with the resin black matrix, the present invention is not limited to that. That is, the color filter can be formed in contact with the upper portion of the resin black matrix.

Also, the present invention can also be applied to an IPS LCD and the Thin Film transistor on color (TOC) or color filter on thin film transistor (COT) LCD, as well as the TN LCD.

Figure 4:
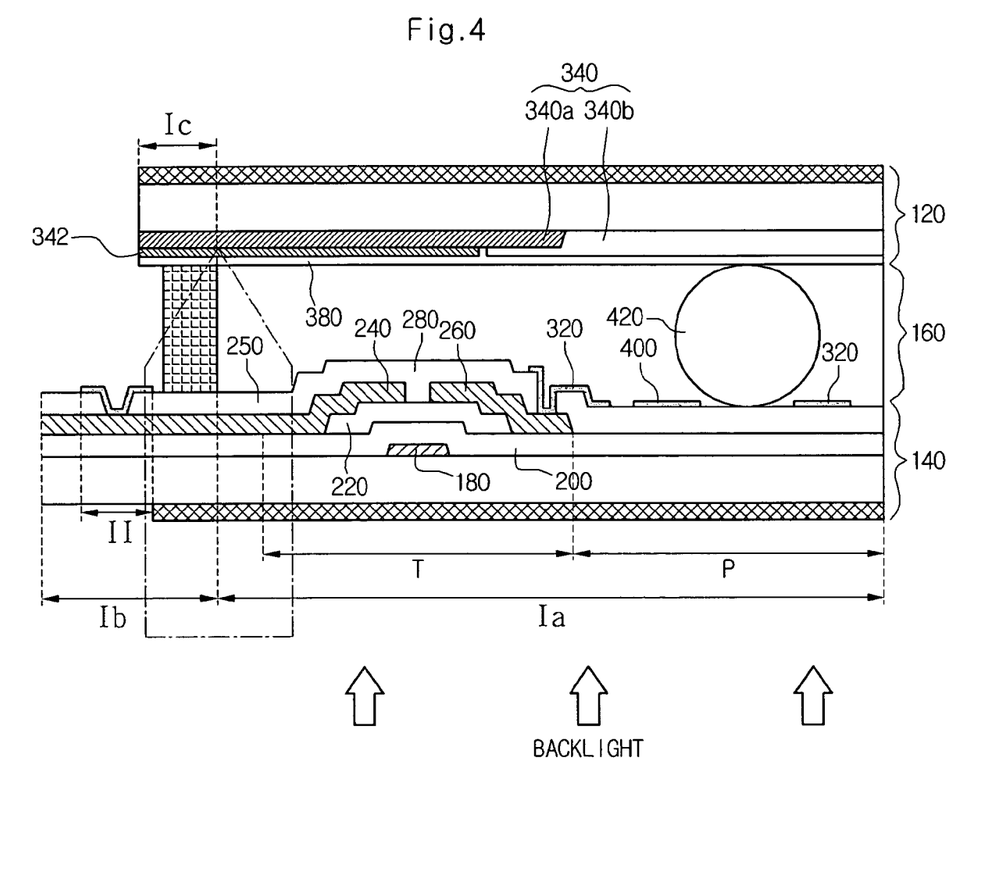
FIG. 4 is a sectional view of an LCD according to another embodiment of the present invention.

FIG. 4 is a sectional view of an LCD according to another embodiment of the present invention.

An IPS LCD is shown in FIG. 4. A predetermined color filter 342 is formed so as to prevent light leakage due to the transmission of light having a specific wavelength in the resin black matrix 340a of the non-active region.

The same reference numerals are used to refer to the same elements as those of FIG. 3.

In the IPS LCD, a pixel electrode 320 and a common electrode 400 are formed on the same plane in the lower substrate 140. The liquid crystals operate by a horizontal electric field applied to the pixel electrode and the common electrode, which are formed on the lower substrate. The upper substrate 120 is provided with a substrate having the color filter layer 340.

As shown in FIG. 4, the IPS LCD includes an upper substrate (a color filter substrate) 120, a lower substrate (an array substrate) 140, and a liquid crystal layer 160. The upper substrate 120 is arranged facing the lower substrate 140, and the liquid crystal layer 160 is interposed between the upper substrate 120 and the lower substrate 140.

An active region Ia containing a pixel region P is defined in the lower substrate 140, and a first non-active region Ib is defined in an outer periphery of the active region Ia. A second non-active region Ic is defined in the upper substrate 120. The second non-active region Ic is located at a position that is, as a whole, closer to the active region Ia than the first non-active region Ib corresponding to the lower substrate 140.

A thin film transistor T is formed on the active region Ia of the lower substrate 140. The thin film transistor T includes a gate electrode 180, a semiconductor layer 220, and source and drain electrodes 240 and 260. Also, a pixel electrode 320 and a common electrode 400 connected to the thin film transistor T are formed on the pixel region P.

The pixel electrode 320 and the common electrode 400 are configured in a finger type arrangement in which they are spaced apart by a predetermined distance on the same plane, and form an in-plane electric field.

A color filter layer 340 and a planarization layer 380 are formed on the upper substrate 120.

At this time, the color filter layer 340 includes a black matrix 340a and a color filter 340b. The black matrix 340a is formed over the thin film transistor T and the second non-active region Ic, and the color filter 340b partially overlaps the black matrix 340a and includes red (R), green (B) and blue (B) colors that are repetitively formed on the pixel region P.

In this embodiment, a predetermined color filter 342 is further formed in contact with the black matrix 340a formed in a periphery of the active region Ia.

As described above, in the resin black matrix, the Optical Density (OD) value varies with the wavelengths of the incident light. Thus, considering this characteristic, one of the R, G and B color filters used in the color filter layer 340 is formed on the upper or lower portion of the resin black matrix 340a formed on the non-active region. In this manner, it is possible to prevent the light having the OD vulnerable wavelength of the resin black matrix from passing through the resin black matrix.

That is, the resin black matrix 340a has different transmittance characteristics in the different wavelengths of the incident light according to the manufacturing methods of the resin black matrix 340a. The OD characteristic that is an ability to shield light is determined by the transmittance characteristics. When such a high brightness model, that is, for example a high-brightness beam of 5000 nit or more, is supplied to the LCD panel, the resin black matrix 340a has the OD value that is changed by a transmittance characteristic, as described above. Thus, the beam cannot be effectively shielded.

According to the present invention, however, the transmittance characteristics of the specific wavelength in the resin black matrix 340a can be improved by additionally forming one color filter 342 of the R, G and B color filters in contact with the resin black matrix 340a formed in the non-active region.

Referring to FIGS. 2A and 2B, the characteristics of the resin black matrix that is made of material A and is susceptible to the wavelength of 550 nm or more can be improved by further forming the B color filter in the non-active region where the resin black matrix made of material A is formed. Consequently, the light leakage in the periphery of the LCD can be prevented.

Figure 5:
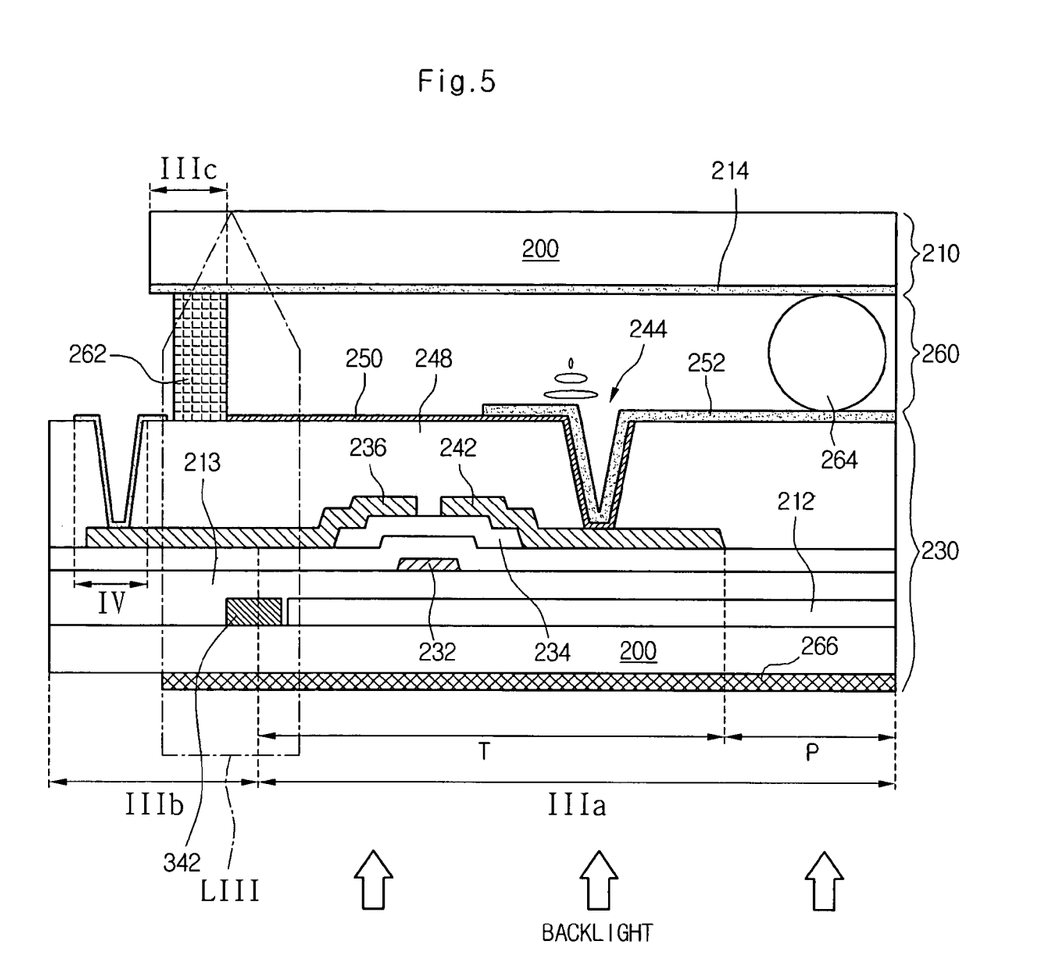
FIG. 5 is a sectional of an LCD according to a further another embodiment of the present invention.

FIG. 5 is a sectional view of an LCD according to a another embodiment of the present invention. In FIG. 5, a TOC structure is illustrated.

In this embodiment, a predetermined color filter 342 is formed so as to prevent light leakage due to the transmission of light having a specific wavelength in the resin black matrix 340a of the non-active region.

In FIG. 5, the TOC structure includes upper and lower substrates 210 and 230 facing each other, and a liquid crystal layer 260 interposed between the upper and lower substrates 210 and 230. A color filter 212 is formed on a transparent substrate 200 of the lower substrate 230 and R, G and B colors are repetitively provided in pixel region P. A planarization layer 213 is formed on the color boundaries and the upper portion of the color filter 212.

Also, a thin film transistor T is formed on the planarization layer 213. The thin film transistor T includes a gate electrode 232, a semiconductor layer 234, and source and drain electrodes 236 and 242. A passivation layer 248 having a drain contact hole 244 is formed on the thin film transistor T.

In addition, a black matrix 250 is formed on the passivation layer 248 such that it covers the thin film transistor T in such a state that it is connected to a drain electrode 242 through the drain contact hole 244. A pixel electrode 252 is formed in the pixel region P in connection with the black matrix 250.

A pad part IV is formed in the first non-active region IIIb of the lower substrate 230 and is connected to an external circuit. A common electrode 214 is formed on a lower surface of the transparent substrate 200 of the upper substrate 210.

The LCD having the TOC or COT structure is characterized in that one color filter 212 of the R, G and B color filters is further formed below the resin black matrix 250 formed on the non-active region. In this manner, it is possible to improve the transmittance characteristic of the specific wavelength in the resin black matrix.

In FIGS. 2A and 2B, the characteristics of the resin black matrix that is made of material A and is susceptible to the wavelength of 550 nm or more can be improved by further forming the B color filter in the non-active region where the resin black matrix made of material A is formed. Consequently, the light leakage in the periphery of the LCD can be prevented.

According to the present invention, the high-brightness LCD can prevent the light leakage in the non-active region.

Also, it is unnecessary to increase the thickness of the black matrix in the non-active region and thus it is possible to reduce the overlap step between the color filter and the black matrix in the active region.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a lower substrate having a thin film transistor, a pixel electrode and a common electrode the pixel electrode and the common electrode being configured in a finger type arrangement;
   an upper substrate facing the lower substrate, wherein an active region and a non-active region are defined in the lower and the upper substrates, the active region includes a plurality of pixel regions, and the non-active region is defined by a periphery or seal pattern region of the active region;
   a liquid crystal layer interposed between the upper substrate and the lower substrate;
   a black matrix formed on the upper substrate in the active region;
   an another black matrix formed on the upper substrate in the non-active region, the another black matrix extending the black matrix;
   red, green and blue color filters partially overlapping the black matrix in the active region; and
   an another color filter formed overlapping the another black matrix in the non-active seal pattern region,
   wherein the another color filter covers the black matrix and the another black matrix.

2. The liquid crystal display device according to claim 1, wherein the black matrix is formed of a resin-based material.

3. The liquid crystal display device according to claim 1, wherein the another color filter is one of the red, green and blue color filters.

4. The liquid crystal display device according to claim 3, wherein the another color filter is formed on an upper or lower portion of the black matrix.

5. The liquid crystal display device according to claim 3, wherein the another color filter is formed of one of the red, green and blue color filters having a low transmittance with respect to a specific wavelength of light so as to prevent transmission of the light of the specific wavelength through the black matrix.

6. A method of fabricating a liquid crystal display device, comprising:
   forming a lower substrate having a thin film transistor, a pixel electrode and a common electrode the pixel electrode and the common electrode being configured in a finger type arrangement;
   forming an upper substrate that faces the lower substrate, wherein an active region and a non-active region are defined in the lower and the upper substrates, the active region includes a plurality of pixel regions, and the non-active region is defined by a periphery or seal pattern region of the active region;
   forming a liquid crystal layer between the upper substrate and the lower substrate;
   forming a black matrix on the upper substrate in the active region;
   an another black matrix formed on the upper substrate in the non-active region, the another black matrix extending the black matrix;
   forming red, green and blue color filters partially overlapping the black matrix in the active region; and
   forming an another color filter that overlaps the another black matrix in the non-active seal pattern region,
   wherein the another color filter covers the black matrix and the another black matrix.

7. The method of claim 6, wherein the black matrix is formed of a resin-based material.

8. The method of claim 6, wherein the another color filter is formed of one of the red, green and blue color filters.

9. The method of claim 8, wherein the color another filter is formed on an upper or lower portion of the black matrix.

10. The method of claim 8, wherein the another color filter is formed of one of red, green and blue color filters having a low transmittance with respect to a specific wavelength of light so as to prevent transmission of the light of the specific wavelength through the black matrix.

11. A liquid crystal display device comprising:
   a lower substrate having a thin film transistor and a pixel electrode;
   an upper substrate facing the lower substrate and having a common electrode, wherein an active region and a non-active region are defined in the lower and the upper substrates, the active region includes a plurality of pixel regions, and the non-active region is defined by a periphery or seal pattern region of the active region;
   a liquid crystal layer interposed between the upper substrate and the lower substrate;
   a black matrix formed on the upper substrate in the active region;
   an another black matrix formed on the upper substrate in the non-active region, the another black matrix extending the black matrix;
   red, green and blue color filters partially overlapping the black matrix in the active region; and an another color filter formed overlapping the another black matrix in the non-active seal pattern region, wherein the another color filter covers the black matrix and the another black matrix.

12. A liquid crystal display device comprising:
a lower substrate having a thin film transistor and a pixel electrode;
an upper substrate facing the lower substrate and having a common electrode, wherein an active region and a non-active region are defined in the lower and the upper substrates, the active region includes a plurality of pixel regions, and the non-active region is defined by a periphery or seal pattern region of the active region;
a liquid crystal layer interposed between the upper substrate and the lower substrate;
a black matrix formed that covers the thin film transistor, is formed on the lower substrate, and is connected to a drain electrode of the thin film transistor;
an another black matrix formed on the lower substrate in the non-active region, the another black matrix extending the black matrix;
red, green and blue color filters formed in the active region; and
an another color filter spaced apart from the red, green and blue color filters in the non-active region and in the same layer as the red, green and blue color filters,
wherein the another color filter covers the another black matrix in the non-active region seal pattern, and
wherein the pixel electrode is formed in each pixel region in connection with the black matrix.

13. The liquid crystal display device according to claim 12, wherein the liquid crystal display device has a TOC structure, wherein the red, green and blue color filters and the thin film transistor are formed together on the lower substrate.

14. The liquid crystal display device according to claim 12, wherein the liquid crystal display device has a COT structure, wherein the red, green and blue color filters and the thin film transistor are formed together in the lower substrate.

* * * * *